United States Patent Office

3,311,589
EPOXY RESIN COMPOSITIONS CURED WITH REACTION PRODUCTS OF DICARBOXYLIC ANHYDRIDES, ALIPHATIC DIOLS AND TERTIARY AMINES
Leo S. Kohn, Schenectady, N.Y., and John J. Keane, Pittsfield, Mass., assignors to General Electric Company, a corporation of New York
No Drawing. Filed Dec. 20, 1962, Ser. No. 246,009
7 Claims. (Cl. 260—47)

This invention relates to new and useful epoxy resin compositions. More particularly, the invention relates to such compositions which are possessed of desirable physical, chemical and electrical properties, including a desirably long pot life and which are particularly characterized by their elastomeric quality both at room temperature and elevated temperatures, which makes them particularly useful for coating, impregnating and potting structures which must be electrically insulated without failure while subjected to mechanical stress at high temperatures.

Epoxy, epoxide or ethoxyline resins, as they are variously called, are well known in the art. Generally, such epoxy resins contain an average of more than one epoxy group per molecule and comprise polyether derivatives of polyhydric organic compounds, such derivatives containing 1,2 epoxy groups, the compound being selected from the class consisting of polyhydric alcohols and phenols containing at least two phenolic groups. A typical epoxy resin is disclosed in U.S. Patent 2,324,483 to Castan wherein there is described the reaction product of phenols having at least two phenolic hydroxy groups and an epihalohydrin, such as epichlorohydrin, such reaction product having at least two epoxy groups and curing to a thermoset, infusible mass by the use of a carboxylic or polybasic acid or acid anhydride. In U.S. Patent 2,444,333, there is described the use of organic nitrogen base or amine type materials for curing epoxy resins, such materials often giving a rapid cure at room temperature.

Generally speaking, the hard and rather brittle epoxy resin compositions normally attained with polybasic acid or anhydride or amine type cures are useful in many applications. However, in some cases it is required that such resins be used as adhesives, coatings or bonding compounds in conjunction with other structures such as electrical conductors, laminates, and the like, which expand or move either at room temperature or at elevated temperatures under the stresses of the machines in which they may be used. In such cases it is required that the resin compositions used be rubbery or flexible to prevent the disruptive forces from tearing the structure apart with resultant failure. Thus, when the ends of stator coils of electrodynamic machines are dipped in and sealed with a resinous material, it is desirable that at high operating temperatures of the order of 100° C.–125° C. and above, the insulating resin be rubbery and flexible so that it will conform to the expansion and warping of the stator coil end turns without breaking the seal and without destroying the insulation. By this is not meant simply heat distortion of the material which is permanent, but an ability to yield under high temperature produced stresses and to recover therefrom upon release of the stress.

A principal object of the invention is to provide new epoxy resin compositions which have desirable physical, chemical and electrical characteristics and which are characterized by an elastomeric quality, particularly at elevated temperatures which makes them useful for coating, impregnating and dipping electrical apparatus and other structures.

Briefly, the invention comprises epoxy resin compositions of very limited composition and characteristics which are cured with particular reaction products of anhydrides and diols at restricted temperatures, such cure being accelerated and directed by the use of tertiary amines to produce long chain elastomeric products rather than highly cross-linked rigid materials.

The ethoxyline resins used in conjunction with the invention are, as pointed out, well known in the art. It has been found that the only epoxy resins useful in conjunction with the present invention which will impart to the final composition the desired physical, chemical and electrical character are those which are prepared from the reaction of an epihalohydrin, specifically epichlorohydrin and 2,2-bis(4-hydroxyphenyl)-propane (Bisphenol-A). It is further required, in order to obtain the desirable elastomeric characteristics of this invention, that the epoxy resins contain a very restricted number of OH groups, such OH groups enhancing undesirable cross-linking. It has been found that the epoxy resins which are useful in connection with the present invention shall be liquid and have an epoxide equivalent of from 170–200 and preferably from about 170–185 with an average hydroxyl content of 0 to 0.2 OH group per molecule. Shown in the table below are typical epoxy resins which are useful in connection with this invention.

TABLE I

| Epoxy Resins | Epoxide Equivalent | M.P., °C. | Hydroxyl Content (OH Groups/ Molecule) |
|---|---|---|---|
| Epon 826 | 180–190 | Liquid | 0.1–0.2 |
| Epon 828 | 185–192 | 9 | 0.1–0.2 |
| Araldite 6005 | 180–190 | Liquid | 0.1–0.2 |
| Araldite 6010 | 185–192 | Liquid | 0.1–0.2 |
| ERL 2774 | 185–192 | Liquid | 0.1–0.2 |
| Epi-Rez 510 | 185–192 | Liquid | 0.1–0.2 |
| Dow 332 LC | 175–180 | 15 | 0.05–0.1 |

The anhydrides, which have been found to be useful in connection with the present invention are those having the general formula

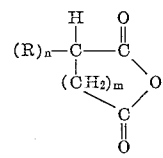

where R is selected from the group consitsing of H and hydrocarbon groups and $n$ is an integer up to about 3 and $m$ is 1 or 2. Typically preferred anhydrides are succinic anhydride, methyl succinic anhydride and glutaric anhydride. It has been found that when $n$ is eight or more, the final cured epoxy resin prepared with the anhydride-glycol reaction product tends to be cheesy and have but little or no elastomeric qualities. The liquid character of the anhydride-glycol reaction product makes possible, in conjunction with the other liquid components, a readily mixed system which is solventless in nature. The corresponding acids of the present anhydrides have been found to be not useful since such acids when used to prepare the curing agent for epoxy resins according to the present invention split off water, enhancing a polyester reaction which produces non-elastomeric final materials.

The glycols which are useful in connection with the present invention are those which contain at least four carbon atoms and up to about 12 carbon atoms, such glycols also being further characterized by the fact that they have only terminal hydroxyl groups. Mixtures of such diols can be used. It will be apparent that hydroxyl groups intermediate to the end groups would again detract from the elastomeric quality of the present materials.

The tertiary amines which are useful as accelerators include all such amines. These amines accelerate the cure and direct it to produce long chain elastomeric products in which the carboxyl groups react primarily with the epoxide groups rather than any hydroxyl groups which latter reaction produces undesirable cross-linking. Typical of useful tertiary amines are dimethylbenzylamine, trisdimethylaminomethylphenol, sold as DMP-30 by Rohm and Haas Company; dimethylaminomethylphenol, sold as DMP-10 by Rohm and Haas Company; and 2-ethylhexanoate of trisdimethylaminomethylphenol, sold as Shell Catalyst D by the Shell Chemical Company. Other tertiary amines will, of course, occur to those skilled in the art. In lieu of using the tertiary amine as such in connection with the present invention, it may be utilized also as an integral part of the anhydride-glycol reaction product. Thus, there may be reacted together one mole of methyldiethanolamine, one mole of succinic anhydride and one mole of glutaric anhydride to provide a material having the formula:

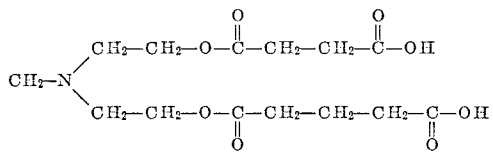

in which the curing agent and tertiary amine are combined in one compound. Also, there may be reacted together one mole of triethanolamine and three moles of glutaric anhydride to provide a material having the formlua:

$$N-(CH_2-CH_2-O-\overset{O}{\underset{\|}{C}}-CH_2-CH_2-CH_2-\overset{O}{\underset{\|}{C}}-OH)_3$$

which, again, is useful in connection with the present invention as a composite curing agent-tertiary amine accelerator and director material. Generally, in order to obtain the proper amount of acid equivalents and the proper amount of tertiary amine, the three-component material is used in conjunction with a glycol-anhydride reaction product as described.

It is important in preparing the anhydride-glycol curing agent of the present invention that the anhydride and glycol be reacted in the ratio of two moles of anhydride to one mole of glycol. Lesser amounts of anhydride promote an undesirable polyester reaction while larger proportions result in the presence of unreacted anhydride which promotes undesirable cross-linking of the epoxy resin. In preparing the curing agent, typically there is used a three-necked round bottom flask equipped with heating mandrel, stirrer, thermometer and dropping funnel through which the anhydride is added to the flask and heated to a temperature of about 115° C. In a typical reaction the source of heat is then removed and the glycol slowly added from a dropping funnel with stirring. Since the reaction in exothermic, the addition of glycol is regulated to hold the temperature in the flask at from about 110 to 120° C. After addition of the glycol is complete, the contents of the flask are allowed to cool to 80° C. and removed. It is particularly important that the temperature of reaction of the anhydride and the glycol in acid be below about 120° C. For example, when reactants comprising one mole of methyl succinic anhydride, one mole of succinic anhydride and one mole of 1,5-pentanediol were heated for four hours at 100° C., the desired present curing agent addition product of anhydride and glycol was obtained. However, when this product was further heated for two hours at 150° C., it was found that the reaction had proceeded to the point where there was present about 75 percent polyester and 25 percent unreacted anhydride. Likewise, it was found that when the original anhydride and glycol ingredients as above were heated for two hours at 150° C., the above undesired ratios of polyester and unreacted anhydride were obtained. It will thus be seen that it is necessary to restrict the temperature of reaction to about 120° C. or below. The following examples illustrate the preparation of the anhydride-glycol curing agent of the present invention. In each case the ingredients set forth were heated for one-half hour at 115-120° C. to obtain a composition having the designated actual equivalent weight which, it will be seen, is very close to the listed theoretical equivalent weight.

TABLE II

| Ex. | Anhydride | Glycol | Theoretical E.W. | Actual E.W. |
|---|---|---|---|---|
| 1 | 1 Methylsuccinic, 1 Succinic | 1-1,5-pentanediol | 159 | 157 |
| 2 | 3 Glutaric | 1-triethanolamine | 163.6 | 160 |
| 3 | 2 Glutaric | 1-neopentyl | 166 | 168 |
| 4 | 1 Succinic, 1 Glutaric | 1-X-2635 (Dow) | 275 | 284 |

| 5 | 1 Glutaric, 1 Succinic | 1-1,5-pentanediol | 159 | 161 |
| 6 | 2 Succinic | do | 152 | 151 |
| 7 | 2 Methylsuccinic | do | 166 | 168 |
| 8 | do | 1-1,9-nonanediol | 194 | 196 |
| 9 | do | 1-1,6-hexanediol | 173 | 174 |
| 10 | do | 1-diethylene glycol | 167 | 168 |
| 11 | 1 Succinic, 1 Methylsuccinic | 1-1,4-butanediol | 152 | 154 |

*Example 12*

This example illustrates the criticality of the reaction temperature which must be adhered to in preparing the anhydride-glycol curing agents of the present invention. There were added together as described two moles of methyl succinic anhydride and one mole of 1,5-pentanediol. One portion of the mixture was heated for eight hours at 100° C. to give a completely reacted adduct which was useful in connection with the present invention. On the other hand, when another portion of such a mixture was heated for two hours at 150° C., it was found that there was present about 20 percent of unreacted anhydride and about 80 percent polyester, making this composition unusable in connection with the invention.

In curing the epoxy resins of the present invention, it has been found that in order to obtain the elastomeric qualities required, the reaction be accomplished without a polyester reaction. In this connection, it has been found that the curing agent shall be used in such amounts that there are present from about 0.85 to 1.0 acid equivalent of curing agent for each epoxide equivalent and that the reaction be carried out at temperatures ranging from 100°-175° C. for from eight hours to one hour, the reaction being of a time-temperature nature. Preferably, the reaction is carried out for about four to eight hours at 125°–150° C. and most preferably for eight hours or more. It has been found that the addition of from about 0.5 to 2 percent by weight of tertiary amine based on the weight of epoxy resin satisfactorily accelerates and directs the reaction to give the desired cure in a convenient time. The following examples illustrate the curing of epoxy resins according to the present invention, it being evident that such examples are typical only of the invention and are not to be taken as limiting in any way. All parts are by weight.

*Example 13*

There were added to 52 parts of Dow 332 LC epoxy resin, 48 parts of the curing agent of Example 5 consisting of the reaction product as described of one mole each of glutaric anhydride, succinic anhydride and 1,5-pentanediol along with three parts of a finely divided silica filler and 0.52 part of Shell Catalyst D. This material was used as an adhesive for low carbon steel panels, the material being applied at a thickness of 5 mils and cured for 16 hours at 150° C., there being one square inch of adhered steel panel area. This test piece after cure was tested on an Instron Tester at .05 inch per minute head speed to give a tensile strength of 1730 p.s.i. The examples shown in the following table were all carried out using Dow DER 332 LC epoxy resin having an epoxide equivalent of 173, there being used one part per hundred parts of epoxy resin of Shell Catalyst D.

pentyl glycol to provide a reaction product having an equivalent weight of 251 as compared to a theoretical equivalent weight of 261. When this material was mixed with Dow 332 LC epoxy resin in such proportions that there was present 0.85 acid equivalent for each epoxide equivalent, along with 1 percent of Shell Catalyst D based on the weight of the epoxy resin and cured for 16 hours at 150° C., there was produced a final composition which was rubbery at room temperature but crumbly at 100° C.

*Example 24*

This example illustrates the use of composite anhydride-glycol-tertiary amine reaction products as combination curing agent-accelerator and director materials in curing the epoxy resins of the invention. There was combined with Dow 332 LC epoxy resin in such amount as to provide one epoxide equivalent a curing agent prepared as above from two moles of methyl succinic anhydride and one mole of 1,5-pentane diol in such amount that there was present 0.9 equivalent of carboxyl groups per equivalent of epoxy resin along with the reaction product of one mole of triethanolamine and three moles of glutaric anhydride as described above, the quantity of such materal being such that there was present an additional 0.1 equivalent of carboxyl per epoxide groups to give a total of 1.0 equivalent of carboxyl for each epoxide equivalent. The amount of amine present in this composition material was equivalent to 2 percent by weight of dimethylbenzylamine based on the weight of the epoxy resin. When

TABLE III

| Ex. | Curing Agent | COOH/ Epoxide Eq. Ratio | 16 hrs. at 150° C. Cure | | 3 Days at 135° C. Aging | | 7 Days at 160° C. Aging | |
|---|---|---|---|---|---|---|---|---|
| | | | T.S., p.s.i. | Elongation, Percent | T.S., p.s.i. | Elongation, Percent | T.S., p.s.i. | Elongation, Percent |
| 14 | 2-methylsuccinic, 1-diethylene glycol | 0.85 1.00 | 1,075 500 | 143 358 | 1,075 535 | 176 366 | 2,310 | 320 |
| 15 | 2-methylsuccinic, 1-1,5-pentanediol | 0.85 1.00 | 1,690 750 | 220 480 | 1,008 595 | 260 344 | 4,350 1,070 | 330 183 |
| 16 | 1-methylsuccinic, 1-succinic, 1-1,5-pentanediol. | 0.85 1.00 | 2,450 842 | 224 368 | 2,770 1,370 | 308 322 | 4,350 3,460 | 200 338 |
| 17 | 2-succinic, 1-1,5-pentanediol | 0.85 1.00 | 2,500 2,900 | 318 143 | 2,570 1,930 | 313 165 | 3,230 3,000 | 145 176 |
| 18 | 2-succinic, 1-diethylene glycol | 0.85 1.00 | 1,557 1,750 | 94 198 | 1,630 2,400 | 72 228 | | |

From the above examples it will be quite evident that there is produced by the present invention epoxy resin compositions which are characterized by good tensile strength and elastomeric qualities.

There were added to Epon 828 and Dow 332 LC a curing agent like that of Example 1 in the amounts shown in Table IV below along with 1 percent of Shell Catalyst D based on the weight of the epoxy resin. This material was cured for 16 hours at 150° C. with the following results.

TABLE IV

| Ex. | Resin | COOH/ Epoxide | Tensile Strength (p.s.i.) | Percent Elongation |
|---|---|---|---|---|
| 19 | Epon 828 | 0.85 | 870 | 145 |
| 20 | Epon 828 | 1.00 | 963 | 467 |
| 21 | Dow 332 LC | 0.85 | 2,450 | 224 |
| 22 | Dow 332 LC | 1.00 | 842 | 368 |

*Example 23*

This example illustrates the undesirability of epoxy resins when cured with the present curing agents wherein $n$ in the anhydride used to prepare the curing agent is a number in excess of three. There was prepared according to Example 1 a curing agent consisting of two moles of n-octenyl succinic anhydride and one mole of neocured as above, this material provided an epoxy resin characterized by salutary elastomeric qualities both at room temperature and at elevated temperatures.

From the above, it will be quite evident that the very specific parameters set forth must be adhered to in order to provide a useful material in accordance with the invention.

There are provided then by the present invention epoxy resin compositions which are possessed of efficacious physical, chemical and electrical properties, including an elastomeric or rubbery quality at room temperature and elevated temperatures which makes them particularly useful as adhesives and as dipping or coating materials which may be used to effectively bond and seal components which are subjected to mechanical stresses at various temperatures.

What we claim as new and desire to secure by Letters Patent of the United States is:

1. A composition of matter comprising the heat reaction product of (1) a complex epoxide resin containing an average of more than one epoxide group per molecule and comprising the reaction product of 2,2-bis-(4-hydroxyphenyl)-propane and epihalohydrin, said epoxide resin having an epoxide equivalent of about 170 to 200 and up to 0.2 hydroxyl group per molecule, (2) a curing agent for said epoxy resin comprising the heat reaction product at temperatures of up to about 120° C. of (a) two moles of anhydride having the formula

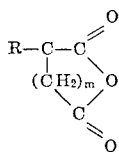

where R is selected from H and methyl groups, and $m$ is an integer up to 2, and (b) one mole of diol containing only terminal hydroxyl groups and having up to about 12 carbon atoms and (3) tertiary amine, said curing agent being present in an amount to provide from about 0.85 to 1 acid equivalent per equivalent of epoxide, said amine being present in the amount of from about 0.25 to 2 percent by weight based on the weight of said epoxide resin.

2. A composition of matter comprising the heat reaction product of (1) a complex epoxide resin containing an average of more than one epoxide group per molecule and comprising the reaction product of 2,2-bis-(4-hydroxyphenyl)-propane and epihalohydrin, said epoxide resin having an epoxide equivalent of about 170 to 185 and up to 0.2 hydroxyl group per molecule, (2) a curing agent for said epoxy resin comprising the heat reaction product at temperatures of up to about 120° C. of (a) two moles of anhydride having the formula

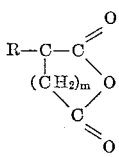

where R is selected from H and methyl groups, and $m$ is an integer up to 2, and (b) one mole of diol containing only terminal hydroxyl groups and having up to about 12 carbon atoms and (3) tertiary amine, said curing agent being present in an amount to provide from about 0.85 to 1 acid equivalent per equivalent of epoxide, said amine being present in the amount of from about 0.25 to 2 percent by weight based on the weight of said epoxide resin.

3. A composition of matter comprising the heat reaction product of (1) a complex epoxide resin containing an average of more than one epoxide group per molecule and comprising the reaction product of 2,2-bis-(4-hydroxyphenyl)-propane and epihalohydrin, said epoxide resin having an epoxide equivalent of about 170 to 200 and up to 0.2 hydroxyl group per molecule, (2) a curing agent for said epoxy resin comprising the heat reaction product at temperatures of up to about 120° C. of (a) two moles of anhydride having the formula

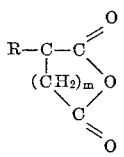

where R is selected from H and methyl groups, and $m$ is an integer up to 2, and (b) one mole of diol containing only terminal hydroxyl groups having up to about 12 carbon atoms and containing at least one tertiary amino group.

4. A composition of matter comprising the heat reaction product of (1) a complex epoxide resin containing an average of more than one epoxide group per molecule and comprising the reaction product of 2,2-bis-(4-hydroxyphenyl)-propane and epihalohydrin, said epoxide resin having an epoxide equivalent of about 170 to 200 and up to 0.2 hydroxyl group per molecule, (2) a curing agent for said epoxy resin comprising the heat reaction product at temperatures of up to about 120° C. of (a) two moles of anhydride selected from the group consisting of succinic anhydride, methylsuccinic anhydride and glutaric anhydride and mixtures thereof, and (b) one mole of diol containing only terminal hydroxyl groups and selected from the class consisting of 1,5-pentanediol, 1,9-nonanediol, neopentyl glycol, diethylene glycol, 1,4-butanediol and 1,6-hexanediol and mixtures thereof and (3) tertiary amine, said curing agent being present in an amount to provide from about 0.85 to 1 acid equivalent per equivalent of epoxide, said amine being present in the amount of from about 0.25 to 2 percent by weight based on the weight of said epoxide resin.

5. A composition of matter comprising the heat reaction product of (1) a complex epoxide resin containing an average of more than one epoxide group per molecule and comprising the reaction product of 2,2-bis-(4-hydroxyphenyl)-propane and epihalohydrin, said epoxide resin having an epoxide equivalent of about 170 to 200 and up to 0.2 hydroxyl group per molecule, (2) a curing agent for said epoxy resin comprising the heat reaction product at temperatures of up to about 120° C. of (a) one mole of glutaric anhydride and one mole of succinic anhydride, and (b) one mole of 1,5-pentanediol and (3) tertiary amine, said curing agent being present in an amount to provide from about 0.85 to 1 acid equivalent per equivalent of epoxide, said amine being present in the amount of from about 0.25 to 2 percent by weight based on the weight of said epoxide resin.

6. A composition of matter comprising the heat reaction product of (1) a complex epoxide resin containing an average of more than one epoxide group per molecule and comprising the reaction product of 2,2-bis-(4-hydroxyphenyl)-propane and epihalohydrin, said epoxide resin having an epoxide equivalent of about 170 to 200 and up to 0.2 hydroxyl group per molecule, (2) a curing agent for said epoxy resin comprising the heat reaction product at temperatures of up to about 120° C. of (a) one mole of methyl succinic anhydride and one mole of succinic anhydride, and (b) one mole of 1,5-pentanediol and (3) tertiary amine, said curing agent being present in an amount to provide from about 0.85 to 1 acid equivalent per equivalent of epoxide, said amine being present in the amount of from about 0.25 to 2 percent by weight based on the weight of said epoxide resin.

7. A compositon of matter comprising the heat reaction product of (1) a complex epoxide resin containing an average of more than one epoxide group per molecule and comprising the reaction product of 2,2-bis-(4-hydroxyphenyl)-propane and epihalohydrin, said epoxide resin having an epoxide equivalent of about 170 to 200 and up to 0.2 hydroxyl group per molecule, (2) a curing agent for said epoxy resin comprising the heat reaction product at temperatures of up to about 120° C. of (a) two moles of glutaric anhydride, and (b) one mole of neopentyl glycol and (3) tertiary amine, said curing agent being present in an amount to provide from about 0.85 to 1 acid equivalent per equivalent of epoxide, said amine being present in the amount of from about 0.25 to 2 percent by weight based on the weight of said epoxide resin.

References Cited by the Examiner

UNITED STATES PATENTS

| | | | |
|---|---|---|---|
| 2,868,767 | 1/1959 | Cyba et al. | 260—47 |
| 2,900,364 | 8/1959 | Wasserman | 260—47 |

FOREIGN PATENTS

| | | | |
|---|---|---|---|
| 586,026 | 10/1959 | Canada. | |

WILLIAM H. SHORT, *Primary Examiner.*

C. A. WENDEL, *Assistant Examiner.*